United States Patent [19]

Seesing et al.

[11] Patent Number: 5,734,695
[45] Date of Patent: Mar. 31, 1998

[54] TELECOMMUNICATION EXCHANGE COMPRISING A PROCESSOR SYSTEM, AND A PROCESSOR SYSTEM

[75] Inventors: Antonius G. J. Seesing, Huizen; Marinus Van Putte, Leusden, both of Netherlands

[73] Assignee: U.S. Philips Corporation, New York, N.Y.

[21] Appl. No.: 499,877

[22] Filed: Jul. 10, 1995

[30] Foreign Application Priority Data

Jul. 15, 1994 [EP] European Pat. Off. ............ 94202068

[51] Int. Cl.$^6$ ............................ H04M 1/24; H04M 3/08; H04M 3/22
[52] U.S. Cl. ............................ 379/9; 379/14; 379/15; 370/216; 395/182.08
[58] Field of Search ............................ 379/9, 10, 14, 379/15; 370/216, 218; 395/180, 181, 182.04, 182.08

[56] References Cited

U.S. PATENT DOCUMENTS

| | | | |
|---|---|---|---|
| 5,134,704 | 7/1992 | Leuty | 370/216 |
| 5,327,418 | 7/1994 | Schlag et al. | 370/58.1 |
| 5,410,703 | 4/1995 | Nilsson et al. | 395/700 |
| 5,421,017 | 5/1995 | Scholz et al. | 395/700 |
| 5,555,418 | 9/1996 | Nilsson et al. | 395/700 |

OTHER PUBLICATIONS

"The '(4,2) Concept' Fault-Tolerant Computer", Philips Technical Review, vol. 41, No. 1, 1983/1984, pp. 1–11.
"(N,K) Concept Fault Tolerance", IEEE Transactions on Computers, vol. C-35, No. 4, Apr. 1986, pp. 339–349.

Primary Examiner—Curtis Kuntz
Assistant Examiner—Binh K. Tieu
Attorney, Agent, or Firm—Leroy Eason

[57] ABSTRACT

A telecommunication exchange is described for switching through telecommunication links, which is controlled by a processor system. The processor system comprises a plurality of parallel-arranged modules which have each a processor. In an operating mode of the processor system the processors operate mutually synchronously. The processor system utilizes a fault-tolerant code. As a result, the entire processor system continues to operate even if faults occur in certain modules. The processor system is further arranged for operating in a software load mode. In this mode the processor system is subdivided into two groups of modules. The processors of the modules of each group operate mutually synchronously. The modules of each group use the code section generated by the modules of that particular group to operate. The software load mode makes it possible to feed new software to the processor system without the need to put the entire system out of order: Either group is loaded with software while the other group continues to take over the working tasks of the processor system. The fault redundancy, however, has strongly diminished or is even no longer present at all.

5 Claims, 6 Drawing Sheets

TELECOMMUNICATION EXCHANGE COMPRISING A PROCESSOR SYSTEM, AND A PROCESSOR SYSTEM

BACKGROUND OF THE INVENTION

1. Field of the Invention

The invention relates to a telecommunication exchange for switching through telecommunication links, the exchange comprising a processor system for controlling the telecommunication exchange, the processor system comprising a plurality of modules each including a processor, the processors being arranged for mutually synchronous operation in a working mode of the processor system and the processor system utilizing a fault-tolerant code.

The invention further relates to a processor system comprising a plurality of modules each including a processor, the processors being arranged for mutually synchronous operation in a working mode of the processor system and the processor system utilizing a fault-tolerant code.

2. Discussion of Related Art

A processor system to be used in a telecommunication exchange as defined in the opening paragraph is known from "The '(4, 2) concept' fault-tolerant computer" by Th. Krol, Philips Technical Review, Vol. 41, 1983/84, No. 1. The processor system described in that document utilizes a (4, 2) fault-tolerant code which belongs to the general class of (N, K) codes. The result of the use of the fault-tolerant code is that certain faults in the modules can be detected and corrected. This provides that even if certain faults in the modules occur, the processor system as a whole will continue to function properly. This is extremely important, especially if the processor system is used for controlling a telecommunication exchange, because such a telecommunication exchange is permitted to have only a very small breakdown rate.

A problem of such a telecommunication exchange is that it has to be put out of order for a rather long period of time when the new software is to be loaded in the processor system. This is extremely detrimental, especially in such a telecommunication exchange which is designed to have a very low breakdown rate.

SUMMARY OF THE INVENTION

It is an object of the invention to provide a telecommunication exchange as defined in the opening paragraph which need not be put out of order when new software is loaded.

Thereto, a telecommunication exchange as defined in the opening paragraph is characterized in that the processor system is further arranged for operating in a software load mode in which the processor system is subdivided into a first and a second group of modules, the processors of the modules of the first group operating mutually synchronously and the processors of the modules of the second group operating mutually synchronously but independently of the processors of the modules of the first group, and in which the first and second groups of modules use a first and a second code section respectively, to operate. The mutually independent operation of the two groups achieves that the modules of either of the two groups can be loaded with new software, while the modules of the other group continue to monitor the working tasks of the system. As a result, the system need not be put out of order, in principle, when the new software is loaded. The software load mode may also be used for temporarily increasing the processor capacity of the system.

In that case either group takes over working tasks of the system independently of each other.

An embodiment for the telecommunication exchange according to the invention is characterized in that the fault-tolerant code is an (N, K) code of the Maximum Distance Separable type, where N=2K and K=2,3, ... and in that the first group and the second group comprise an equal number of modules. Such a system is based on the recognition that when an (N, K) Maximum Distance Separable code is used, the code can be decoded based upon the code section generated by a random combination of K modules, provided that no faults occur in this part. Since N=2K, this creates the possibility of having two groups of K modules each operate independently of each other, while either group takes only the section generated by that particular group into consideration. In the individual groups, however, no fault redundancy occurs any longer.

A further embodiment for the system according to the invention is characterized in that the modules comprise decoders for decoding the code, the decoders comprising converter means designed each for decoding the code in response to a code section coming from K specific modules, the decoders of the modules of the first group and the second group being arranged for utilizing in the software load mode the converter means that operate in response to the first code section generated by modules of the first group and the second code section generated by modules of the second group, respectively. In the working mode there is established in the decoders which modules operate faultlessly. The converter means that works in response to the code section generated by K faultless modules is used for the decoding. In the software load mode is indicated the converter means that works in response to the code generated by the modules of that particular group. This means that the decoders can be easily switched over from working mode to software load mode.

A further embodiment of the system according to the invention is characterized in that the decoders comprise fault localizing-cum-evaluation means for transferring faults in the working mode, the fault localizing-cum-evaluation means being arranged for not indicating faults in the software load mode. In response to information produced by these fault localizing-cum-evaluation means, there is determined in the working mode which converter means is used. This has already been determined in the software load mode, so that the information coming from the fault localizing-cum-evaluation means is not necessary.

BRIEF DESCRIPTION OF THE DRAWINGS

The invention will be further described with reference to a drawing in which.

DETAILED DESCRIPTION OF HE PREFERRED EMBODIMENTS

Figure 1A:
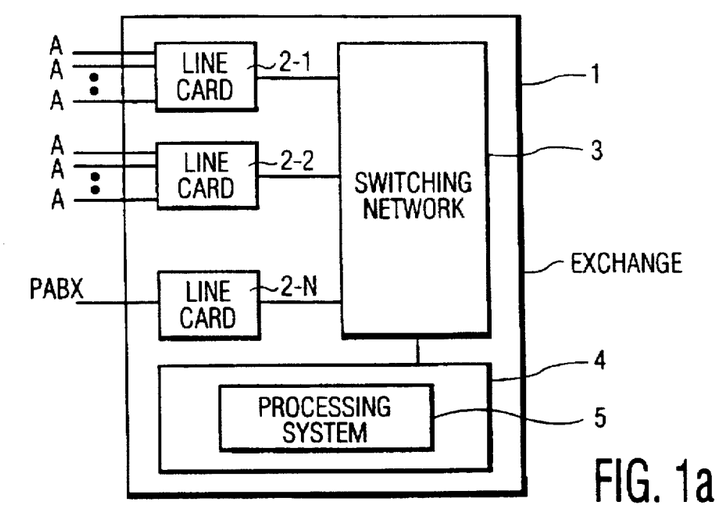
FIG. 1a shows a telecommunication exchange comprising a processor system.

FIG. 1a shows a simplified block diagram of a telecommunication exchange 1. The telecommunication exchange comprises a plurality of line cards 2-1 . . . 2-N which may be connected both to the subscriber lines A and to another telecommunication exchange (PABX). Such line cards 2 form the interface between incoming and outgoing lines in a switching network 3. The switching network provides the proper switching between subscriber lines mutually and the subscriber lines and other telecommunication exchanges. A control section 4 is used, for example, for controlling the switching network. This control section 4 comprises a processor system 5 which utilizes a fault-tolerant code.

Figure 1B:
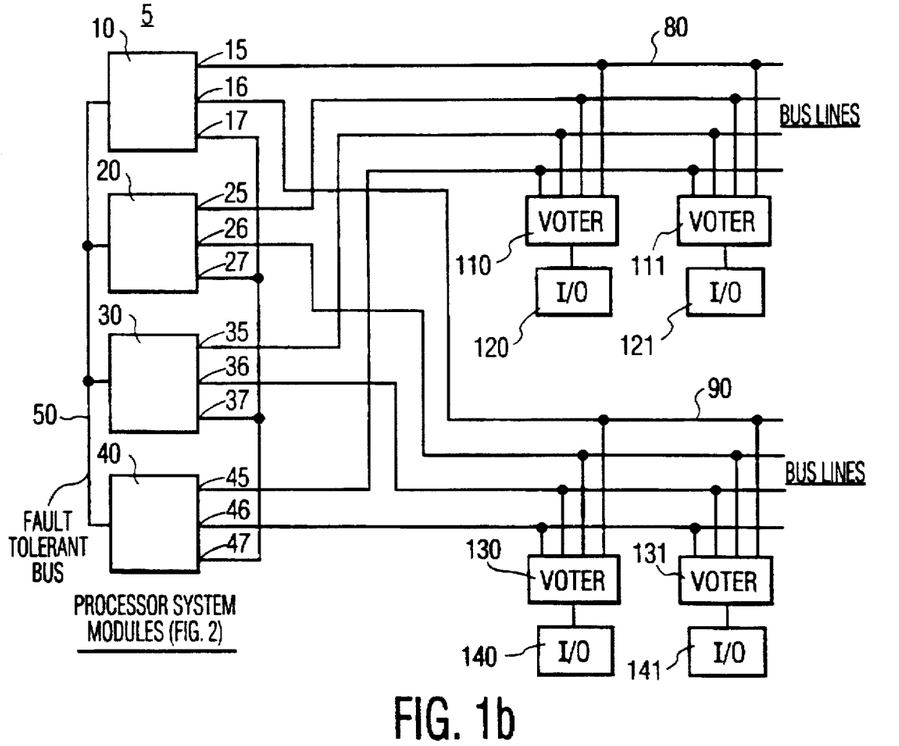
FIG. 1b shows a processor system operating in accordance with the (4,2) fault-tolerant concept together with input/output devices.

FIG. 1b shows a processor system 5 working according to the (4, 2) fault-tolerant concept. The processor system comprises modules 10, 20, 30, 40 running synchronously under normal conditions. The modules 10, 20, 30, 40 are all connected to a first bus 80 via first gates 15, 25, 35, 45 and to a second bus 90 via second gates 16, 26, 36, 46. The input/output devices 120, 121, 140, 141 are connected to these buses. Two buses are used to avoid total system breakdown as a result of a fault on one bus. The two buses comprise four lines each. So-termed voters 110, 111, 130, 131 are inserted between the input/output devices and the buses 80, 90. These voters drive all the lines of the bus when the appropriate input/output device sends a message. The voters make a majority decision based upon the condition of the 4 lines and transfer the result to the input/output device. The modules have each a third gate 17, 27, 37, 47 intended for mutual communication and the modules are all connected to a fault-tolerant bus 50.

Figure 2:
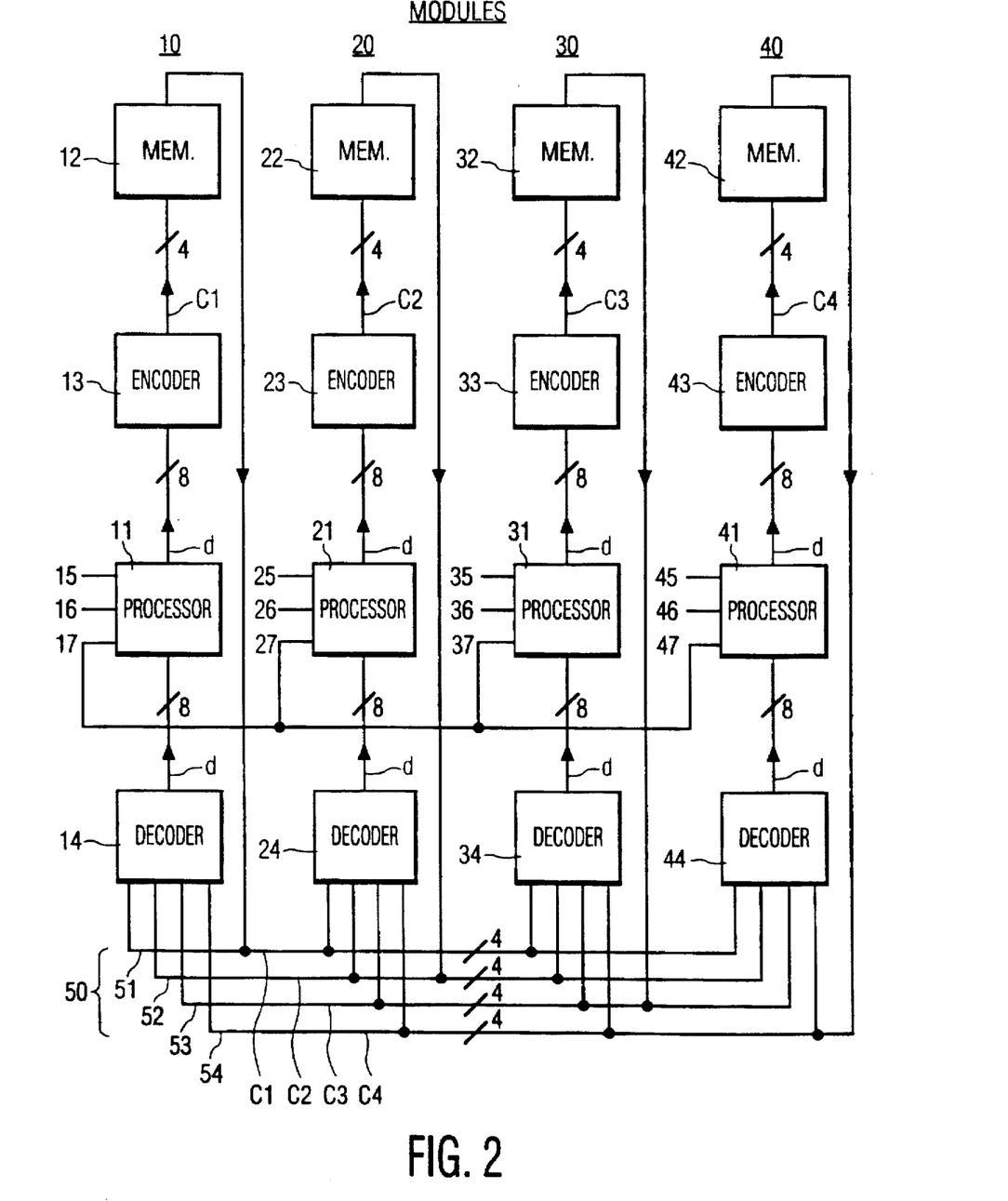
FIG. 2 shows this processor system in more detail.

FIG. 2 shows the processor system modules according to the (4, 2) concept in more detail. Each module 10, 20, 30, 40 comprises a processor 11, 21, 31, 41, a memory 12,22,32,42, an encoder 13, 23, 33, 43 and a decoder 14, 24, 34, 44. Under normal conditions all the processors operate synchronously 8-bit data words d, which may be formed by two 4-bit information symbols, are fed to the memories by the processors. These data words are encoded into four 4-bit symbols C1, C2, C3, C4 by encoders before they are stored in the memory. The modules have mutually different encoders. The four 4-bit symbols together form a 16-bit code word. When the processors read the symbols from the memory, all these symbols are transported to the fault-tolerant bus 50. The fault-tolerant bus 50 comprises 4 lines 51, 52, 53, 54. One symbol is accommodated on each fine, as is shown. When the processor system operates in the fault-tolerant mode each of the decoders take all four of the symbols (thus the complete code word) into consideration. The decoders decode the code word into the original data word. Any two of the four symbols, if correct, will result in the original data word.

The processor system utilizes a (4, 2) Maximum Distance Separable code. An example of such a code is given in "The '(4, 2) concept' fault-tolerant computer" by Th. Krol, Philips Technical Review, Vol. 41, 1983/84, No. 1, pp. 5 to 8. The coding rule thereof can be laid down by means of a generator matrix. For forming a code word from a data word it is sufficient to perform only a matrix multiplication of the generator matrix by a column vector which consists of 2 information symbols which together form the data word. The encoders all separately perform multiplications of a sub-matrix of the generator matrix by the column vector to determine the symbol to be produced by them.

Figure 3:
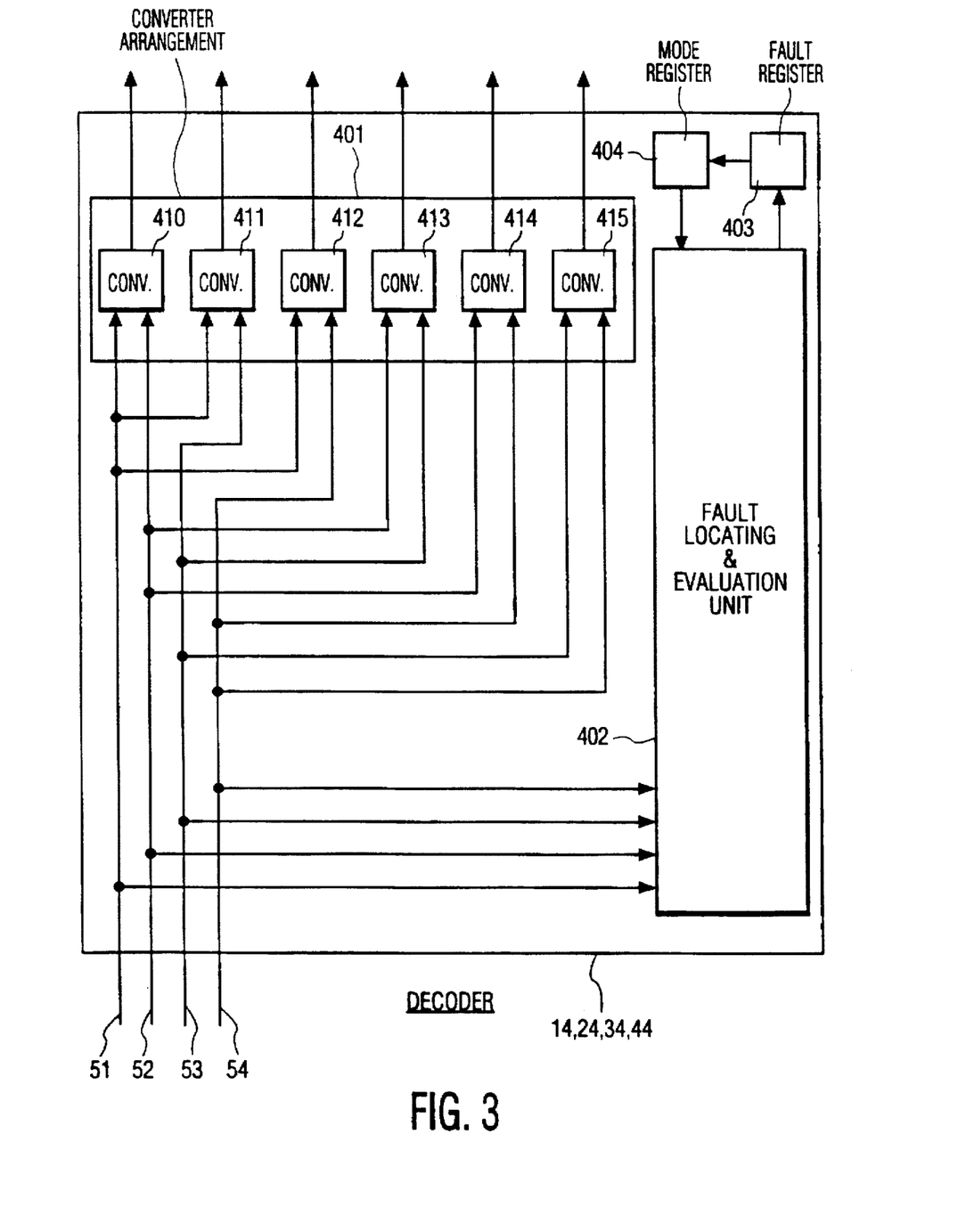
FIG. 3 shows a decoder.

The decoders are supplied with the complete code word, as stated before. The decoders of all the modules are identical. A decoder is shown in more detail in FIG. 3. A decoder suitable for operating in a processor system which works according to the coding rule as described in "The '(4, 2) concept' fault-tolerant computer" by Th. Krol, Philips Technical Review, Vol. 41, 1983/84, No. 1, is described in paragraph 6 of "(N, K) Concept Fault Tolerance" by Thijs Krol, IEEE Transactions on Computers, Vol. C-35, No. 4, April 1986. The decoder comprises a converter arrangement 401, a fault localizing and evaluation unit 402, a fault register 403 and a mode register 404. The converter arrangement 401 comprises 6 converter 410, 411, 412, 413, 414, 415. These compute a data word based upon two of the symbols supplied by the fault-tolerant bus. A property of a (4, 2) Maximum Distance Separable code is that the original data word can be computed from any combination of 2 faultless code symbols. Each converter computes a data word by multiplying the supplied code symbols by the reciprocal matrix of the corresponding sub-matrix of the generator matrix with which the symbols were computed by the encoders. The fault localizing and evaluation unit 402 computes a so-termed syndrome vector by multiplying the symbols by a parity check matrix. From the value of this syndrome vector there may be detected in what symbols faults occur and (in the circumstances) what kind of faults they are. This also establishes which symbols are faultless. The main data of a fault are stored in the fault register 403. If one symbol continues to contain faults, it may be decided that the fault localizing and evaluation unit 402 should discard this symbol. This is written in the mode register. The converter arrangement 401 is informed of which symbols are faultless. Based on this information it decides which of the converters is to be used for feeding a data word to the processor. The exact procedure of the conversion from code symbols to dam words and the fault localization and fault evaluation is described in said paragraph 6 of "(N, K) Concept Fault Tolerance" by Thijs Krol, IEEE Transactions on Computers, Vol. C-35, No. 4, April 1986.

Examples of faults that may be detected and corrected by the processor system working according to the 4, 2 concept are:

The occurrence of a random number of bit faults in a single symbol,

The occurrence of single bit faults in two different symbols,

The occurrence of a single bit fault in a symbol if another symbol is known to be completely wrong.

Figure 4A:
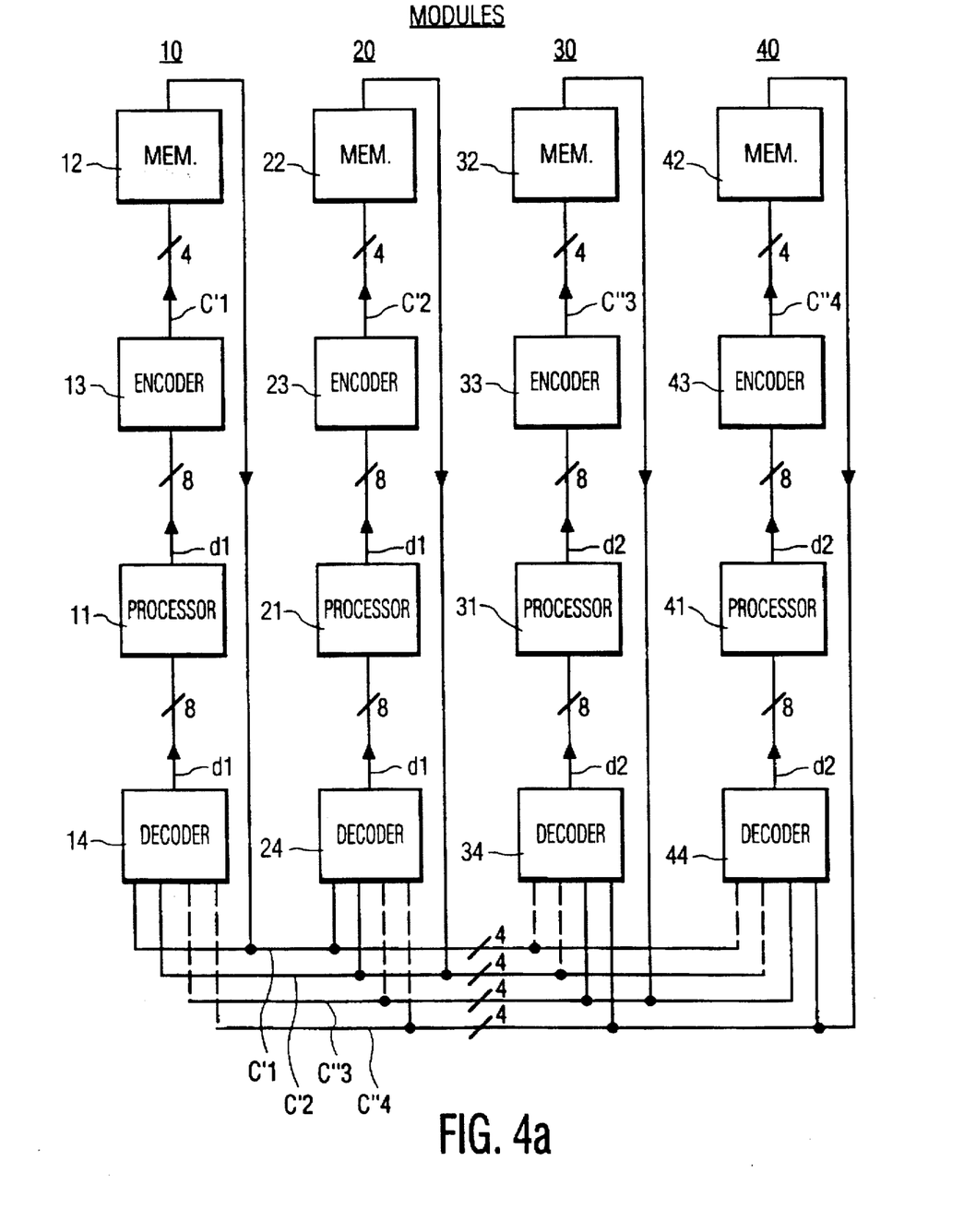
FIG. 4a shows the processor system in the situation in which two groups of modules operate mutually independently.

In the following there will be discussed how the processor system operates when new software is loaded. The processor system (se FIG. 1b) is then subdivided into two groups. The first group is formed by the first two modules 10, 20 and the second group is formed by the other two modules 30, 40. The first group is supplied with software through an input/output device 120. The second group takes over the working tasks. The independent operation of the groups is called the software load mode. The second group communicates with input/output devices connected to the second bus 90. The modules are supplied via an input/output device with a command to be given by an operator. This command is fed to the mode register (see FIG. 3) of all the decoders. It denotes that the fault localizing and evaluation unit are not to indicate any faults any longer, and it further denotes which symbols are to be taken into consideration by the decoder for recovering the original data word. FIG. 4a shows the processor system in the situation in which the first group of modules 10, 20 and the second group of modules 30, 40 operate independently of each other. The processors of the two groups generate different data words d1, d2. The code symbols c'1, c'2 are generated by the encoders of the first group based upon the first data word d1 and the code symbols eA3.c"4 are generated by the encoders of the second group based upon the other data word d2. These data words are recovered by the decoders by only taking the symbols coming from their own groups into consideration. FIG. 4a diagrammatically shows by solid lines from the fault-tolerant bus to a decoder the symbols that the decoder takes into consideration and by means of dashed lines the symbols that such decoder does not take into consideration.

The command sets the decoders 14, 24 of the first group to take only the symbols on the first two lines 51, 52 of the fault-tolerant bus 50 into consideration. In each of these decoders the data word to be fed to the processors is computed by the converter means 410 working on the basis of the symbols c'1 and c'2. The command sets the decoders 34, 44 of the second group to take only the symbols on the other two lines 53, 54 of the fault-tolerant bus 50 into consideration. Thus in each of these decoders the data word to be supplied is computed by the converter means 415 based upon the symbols c"3 and c"4. In neither group does fault tolerance occur any longer. In the software load mode the fault localizing and evaluation means 402 is set not to indicate faults any longer.

Also the input/output devices are set to let the processor system (see FIG. 1b)operate in the software load mode. The first group of modules loaded with software communicates with the input/output device 120 on the first bus 80 through the first gates 15, 25 of these modules. The second group of modules taking over the working tasks communicates with the input/output devices 140, 141 on the second bus 90 through the second gates 36, 46 of these modules. The modules of the first group ignore messages arriving at their second gates 16,26. They do not send any messages through these second gates. The modules of the second group ignore messages arriving at their first gates 35, 45. They do not send any messages through these first gates. The voters are set by the command given by the operator, so that they pass on to the appropriate input/output devices the voltage level on the lines of the group of modules with which the appropriate input/output devices communicate.

Figure 4B:
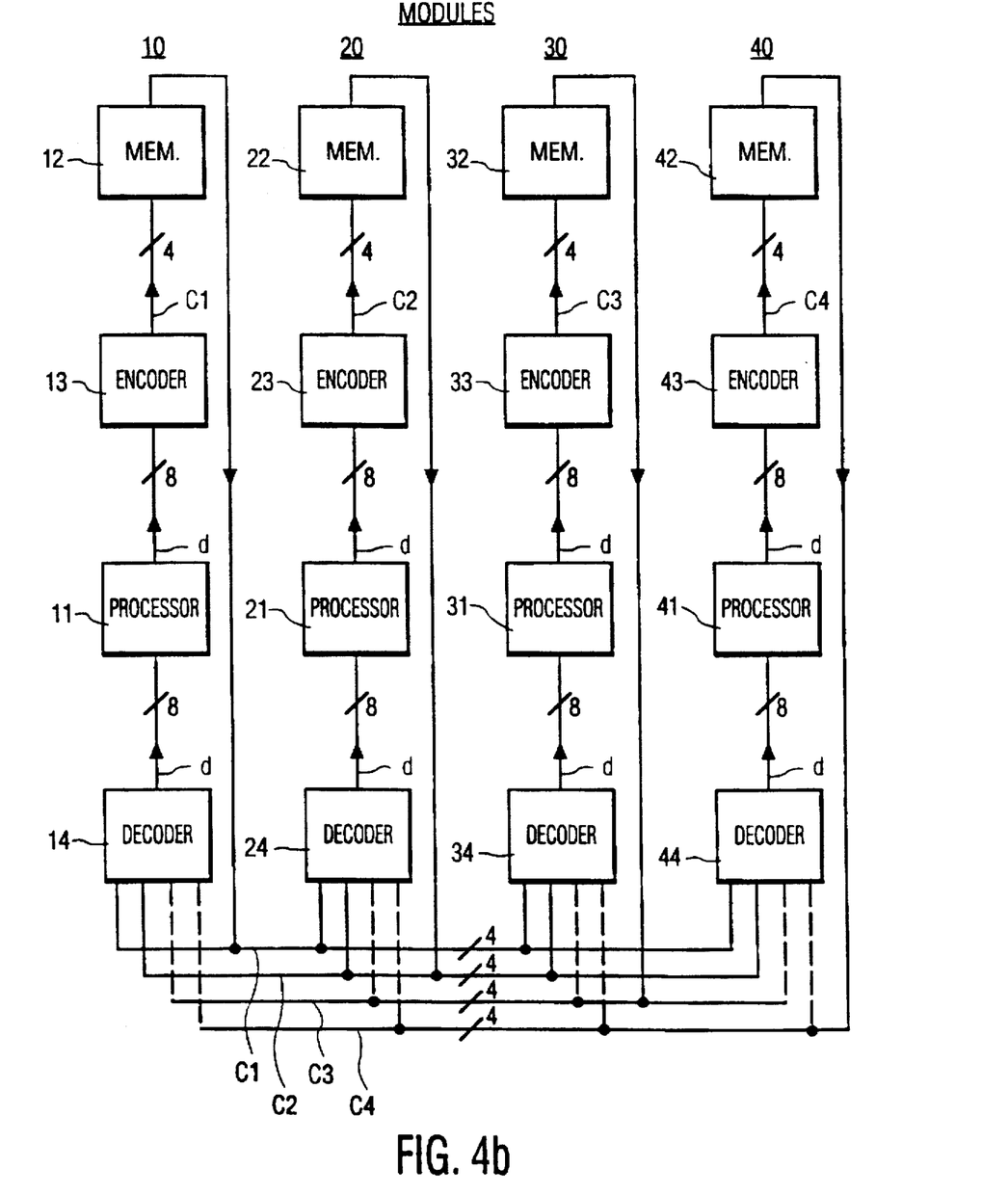
FIG. 4b shows the processor system in the situation in which it operates in a so-called single mode.

The processor system can also operate in a so-termed single mode. In this mode all the modules operate in synchronism. The decoders of all the modules use the same two symbols for recovering the data word. The other two symbols are discarded by all the decoders. As a result, just as in the software load mode there is no fault tolerance either in the single mode. FIG. 4b shows the processor system in single mode, in which all the decoders utilize symbols c1, c2 generated by the first group of modules 10, 20 and discard the symbols c3, c4 generated by the second group of modules 30, 40. The drawing Figure diagrammatically shows by means of solid lines from the fault-tolerant bus to the decoder the symbols being taken into consideration by a decoder and by means of the dashed lines the symbols discarded by a decoder. In the situation shown in FIG. 4b it is not necessary for the memories 32, 42 of the second group of modules 30, 40 to have the same software as the memories 12, 22 of the first group of modules 10, 20. The symbols generated by the second group of modules 30, 40 are, for that matter, discarded. In the situation shown in FIG. 4b all the modules operate on the software present in the memories 12, 22 of the first group of modules 10, 20.

Figure 5:
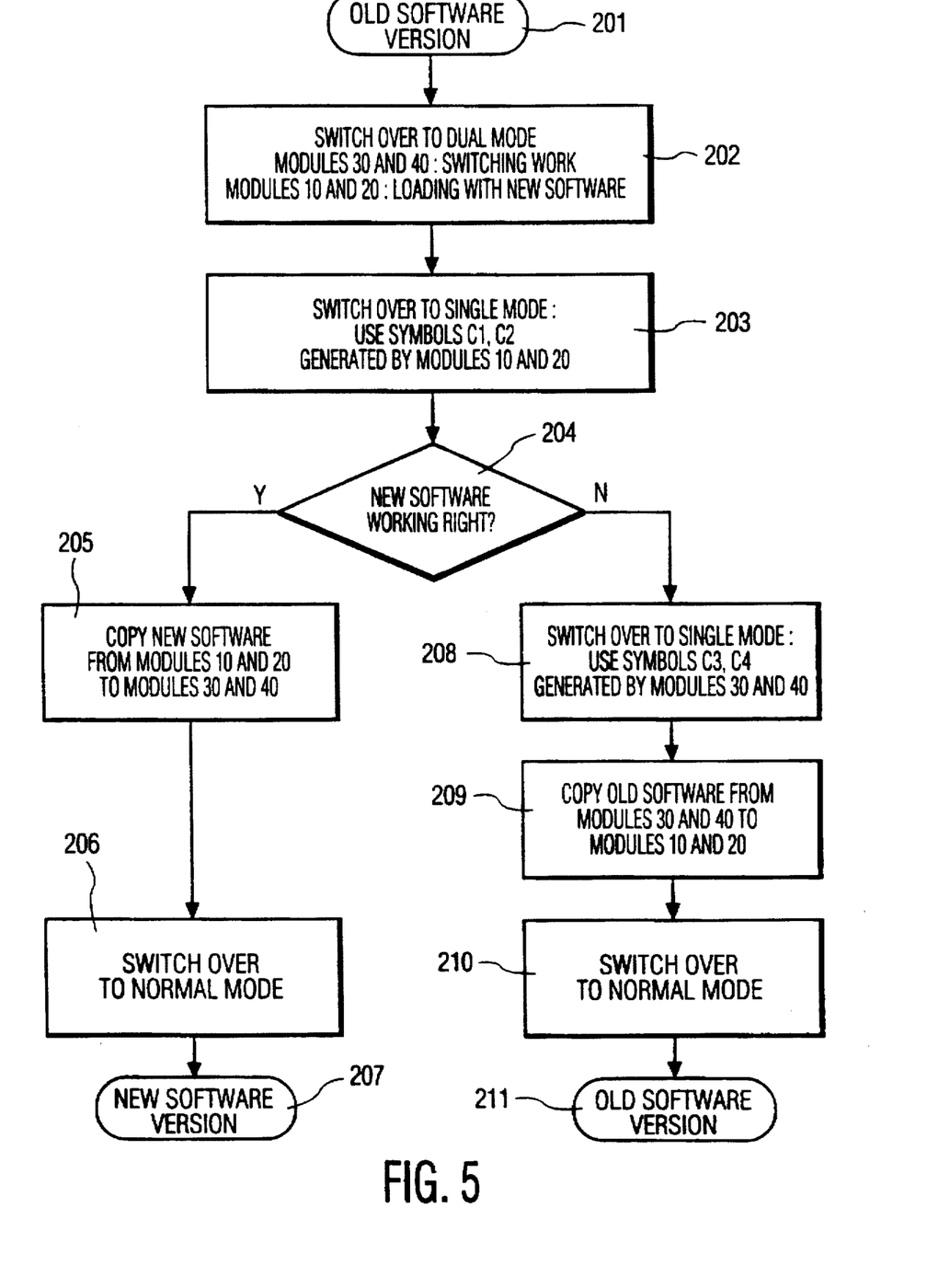
FIG. 5 shows a flow chart for loading the processor system with software.

FIG. 5 shows a flow chart of the loading of the processor system with new software. The situation is assumed in which the processors operate in the working mode and have old software that is to be replaced (201). Subsequently, the software load mode (202) is switched over to at a command to be given by an operator. As described previously, the two groups now operate separately and without fault tolerance. The first group of modules 10, 20 is supplied with new software, while the second group of modules 30, 40 takes over the symbols generated by the first group of modules 10, 20 (203). This means that the processor working tasks. When the new software has been loaded completely, a single mode is switched over to in which the decoders of all the modules 10, 20, 30, 40 operate on the basis of the system now operates on the new software loaded in the memories of only the first group of modules 10, 20. Subsequently, a test is made whether the new software works all right (204). This is simply effected by checking after a certain period of time whether faults have occurred. If no faults have occurred, the new software is copied from the first group of modules 10, 20 to the second group of modules 30, 40 (205). Subsequently, the normal mode (206) is switched over to in which the modules operate in synchronism and with fault tolerance. The processor system now works on new software (207).

If the new software does contain faults, another single mode (208) is switched over to in which the decoders of all the modules 10, 20, 30, 40 work on the basis of the symbols generated by the second group of modules 30, 40. This means that the processor system now works on the software already present in the memories of the second group of modules 30, 40. This group of modules contains the old software which still performed well the moment the software load mode was switched over to. Subsequently, the old software is copied to the first group of modules 10, 20 (209). Then the normal fault tolerance mode (210) is switched over to. The processor system now again works on the old software (211). By first testing the new software, however, there is avoided that the processor system is out of operation for a rather long period of time in the case of faults occurring in the new software.

We claim:

1. Telecommunication exchange for switching through telecommunication links, the exchange comprising a processor system for controlling the telecommunication exchange, the processor system comprising a plurality of modules each including a processor, the processors being arranged for mutually synchronous operation to provide fault tolerant redundancy in a working mode of the processor system and the processor system utilizing a fault-tolerant code having different code sections; characterized in that the processor system is further arranged for operating in a software load mode in which the modules are divided into first and second groups of modules, the processors of the modules of the first group operating mutually synchronously and the processors of the modules of the second group operating mutually synchronously but independently of the processors of the modules of the first group, and in which the first and second groups of modules respectively use first and second different sections of said code during operation.

2. Telecommunication exchange as claimed in claim 1, characterized in that the fault-tolerant code is an (N, K) code of the Maximum Distance Separable type, where N =2K and K=2,3, ... and in that the first group and the second group comprise an equal number (K) of modules.

3. Telecommunication exchange as claimed in claim 2, characterized in that the modules respectively comprise respective decoders for decoding the code; each decoder comprising a plurality of converters each of which decodes in response to code section symbols coming from K specific modules; the decoders of the modules of the first group being arranged for utilizing, in the software load mode, only those of the converters that operate in response to first code section symbols generated by the modules of the first group; and the decoders of the modules of the second group being arranged for utilizing, in the software mode, only those of the converters that operate in response to second code section symbols generated by the modules of the second group.

4. Telecommunication exchange as claimed in claim 3, characterized in that each of the decoders comprises fault localizing and evaluation means for indicating faults in code symbols during the working mode but not during the software load mode.

5. Processor system comprising a plurality of modules which contain each a processor, the processors being arranged for mutually synchronous operation to provide fault tolerant redundancy in a working mode of the processor system and the processor system utilizing a fault-tolerant code having different code sections; characterized in that the processor system is further arranged for operating in a software load mode in which the modules are divided into first and second groups of modules, the processors of the modules of the first group operating mutually synchronously and the processors of the modules of the second group operating mutually synchronously but independently of the processors of the modules of the first group, and in which the first and second groups of modules respectively use first and second different sections of said code during operation.

* * * * *